United States Patent [19]

Stillwell

[11] Patent Number: 4,887,291

[45] Date of Patent: Dec. 12, 1989

[54] SYSTEM FOR ANNUNCIATING EMERGENCIES

[75] Inventor: James T. Stillwell, Silver Spring, Md.

[73] Assignee: American Monitoring Systems, Inc., Ashton, Md.

[21] Appl. No.: 76,750

[22] Filed: Jul. 23, 1987

[51] Int. Cl.$^4$ .................... H04M 11/04; G08B 25/00
[52] U.S. Cl. ........................................ 379/39; 379/50; 379/57; 340/511; 340/506
[58] Field of Search ................. 379/37, 39, 40, 42–44, 379/46–51, 57; 340/506, 509, 511, 512, 507, 508, 514, 516, 500

[56] References Cited

U.S. PATENT DOCUMENTS

| | | | |
|---|---|---|---|
| 3,858,195 | 12/1974 | Gregg, Jr. et al. | 340/514 X |
| 3,914,692 | 10/1975 | Seaborn, Jr. | |
| 4,273,961 | 6/1981 | Blank et al. | 379/40 |
| 4,339,746 | 7/1982 | Ulicki et al. | 379/40 X |
| 4,382,256 | 5/1983 | Nagata. | |
| 4,385,295 | 5/1983 | Willard et al. | |
| 4,450,320 | 5/1984 | Ostermann et al. | 379/45 |
| 4,521,645 | 6/1985 | Carroll | 379/51 X |
| 4,618,860 | 10/1986 | Mori | 379/57 X |
| 4,652,859 | 3/1987 | Van Wienen | 340/531 X |
| 4,692,742 | 9/1987 | Raizen et al. | 379/49 X |
| 4,751,498 | 6/1988 | Shalvi et al. | 340/506 X |

Primary Examiner—Keith E. George
Attorney, Agent, or Firm—Dennison, Meserole, Pollack & Scheiner

[57] ABSTRACT

Disclosed is a system that can monitor occupied or unoccupied buildings, and annuciate to a distant point, e.g. a digital pocket paper, emergency events such as burglaries, fires, high or low temperature, high or low flow rate in such devices as boilers and many more. The system has a circuit that makes interfacing with most commercial field detectors especially easy, and a circuit that enables the system to easily access telephone lines, so as to transmit annunciation messages.

6 Claims, 3 Drawing Sheets

SYSTEM FOR ANNUNCIATING EMERGENCIES

BACKGROUND OF THE INVENTION

Any unoccupied building can be subject to a wide range of emergencies requiring immediate attention, such as burglaries, fires, equipment failures, (e.g. boilers, water pipes, etc.), and when such buildings are unoccupied, the danger is obviously most great. Any system that can identify such emergencies, characterize them, and transmit this information to a distant receiver would plainly be of great value to anyone owning any kind of building, be it commercial or residential. Any such system that can do this while being simple to manufacture and operate, and inexpensive to purchase, is plainly of even greater value.

OBJECTS OF THE INVENTION

Accordingly, it is an object of this invention to provide a system for automatically monitoring the status and safety of a wide range of buildings, and report the existence and kind of emergency events to distant locations.

It is a further object of this invention to provide such a system that can detect a wide range of such events, e.g. burglaries, fires, temperature excursions, extremely high or low flow rates, extremely high or low pressures, and many, many others.

It is a further object of this invention to provide such a system having a circuit that enables the system to be readily adaptable for use with a wide range of commercially available detectors (e.g. burglar alarms, fire detectors, thermocouples, flowmeters, pressure sensors, etc.).

It is a further object of this invention to provide such a system that is inexpensive and easy to manufacture. In particular, it is an object to provide such a system that needs no specially manufactured parts, but rather is assemblable from off-the-shelf components to insure easy and inexpensive manufacture.

It is a further object of this invention to provide such a system that is effective yet simple of construction, so as to insure reliability.

It is a further object of this invention to provide such a system having a circuit capable of enabling the system to easily and reliably access commercial telephone lines so as to report such emergency events to places distant from the event, thereby insuring quick and appropriate response; most typically such a system should be able to report such events to a portable paging unit.

SUMMARY OF THE INVENTION

In accordance with these and other objects that shall become apparent hereinafter, there is disclosed a system compatible with a wide variety of commercially available detectors, and capable of identifying the existence and nature of emergency events, encoding this information in a form transmittable across an ordinary phone line, sending this information to a commericial paging station, thereby enabling the paging station to forward the information in the usual manner to a point distant from both the paging station and the emergency event. Typically, the receiver of this information would be a person wearing a digital pager, the pager being capable of receiving the information sent by the station, and displaying it in a manner whereby the user of the pager can identify the location, nature and magnitude of the emergency event. In a preferred embodiment, the system has a special circuit for accessing quickly and efficiently a commercial telephone line. In another preferred embodiment, the system has a special circuit capable of providing an interface between the system and a wide variety of commercially available detectors, so as to make the system more flexible and easier to use.

The invention will be more fully understood from the following detailed description, it being understood, however, that the invention is capable of extended application, and is not confined to the precise disclosure. Changes and modifications may be made that do not affect the spirit of the invention as set forth in the appended claims, nor exceed the scope thereof.

Accordingly, the instant invention will now be described with particular reference to the accompanying drawings, wherein:

DETAILED DESCRIPTION OF THE INVENTION

Figure 1:
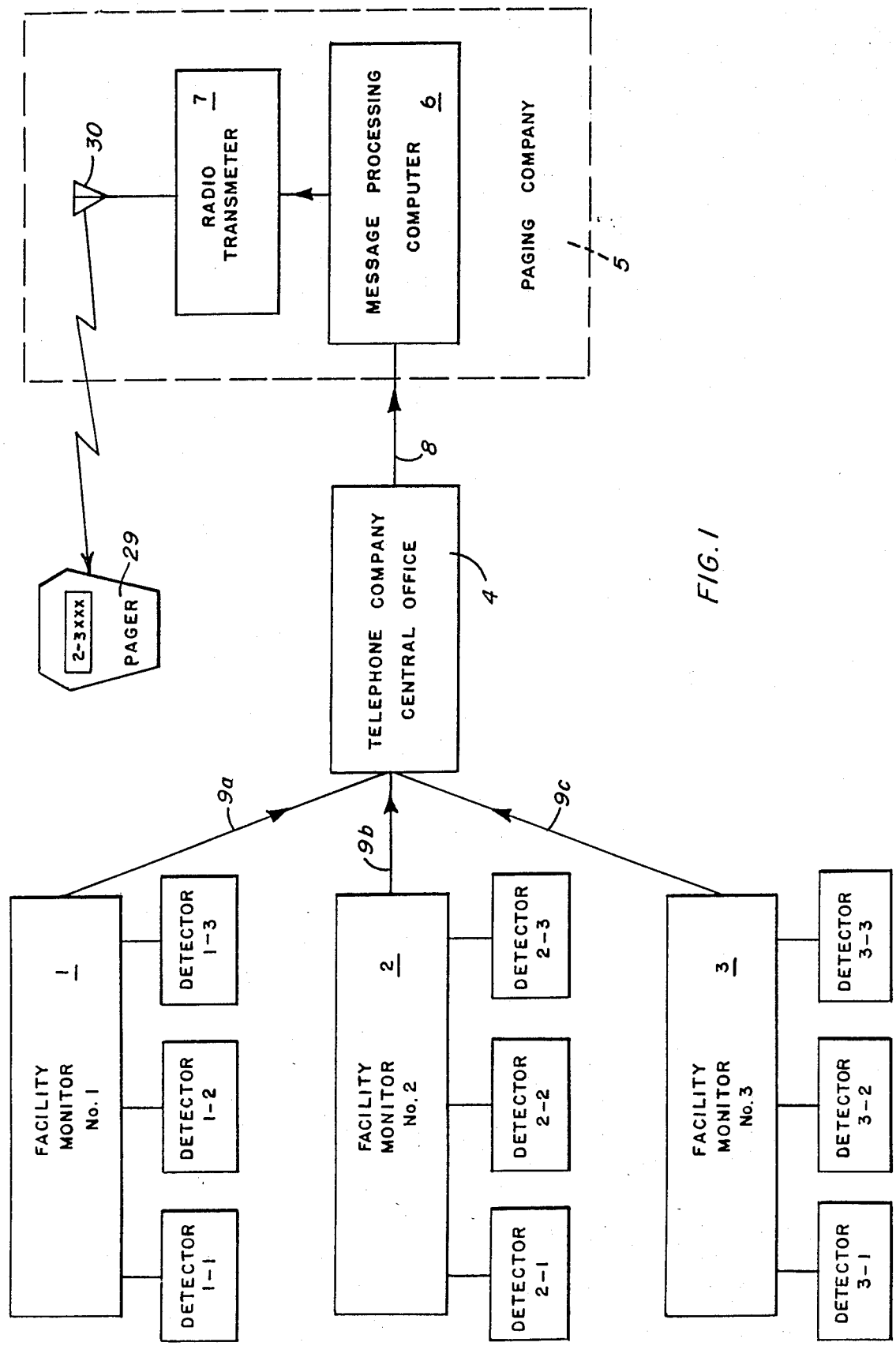
FIG. 1 is a block diagram of the system as a whole.

With particular reference to FIG. 1, one can readily see the scheme of the instant invention. The system employs a plurality of facility monitors, 1, 2, 3, each monitor receiving the input from a plurality of field detectors shown in FIG. 1 as 1-1, 1-2, 1-3, 2-1, 2-2, up to 3-3, etc. Each facility monitor 1, 2, 3 protects one specific location, for example one home or one floor of an office building. Various detectors annunciate different types of emergency events, (e.g. fire, intruder, etc.). Although the system is illustrated with three facility monitors, and three detectors per facility monitor, it is plain that this number is merely illustrative, and the system itself is adaptable to monitor virtually an unlimited number of locations, and a virtually unlimited numbeer of detectors at each location. Detector 2-3 is illustrated in FIG. 1 as being active, that is having identified a particular emergency event. Accordingly, facility monitor 2, with which detector 2-3 is associated, recognizes the event detected by detector 2-3, and transmits across telephone line 9b a signal which identifies detector 2-3 as having been activated, and identifies the kind of emergency event for which detector 2-3 would be activated and the event's magnitude in a manner more fully described in conjunction with FIG. 3, below. Of course, each facility monitor has its own telephone line, illustrated in FIG. 1 as line 9a for monitor 1 and 9c for monitor 3. The encoded message sent on line 9b is received at the telephone company's central office 4, which forwards the information along telephone line 8 to paging company 5. The information from line 8 is typically received directly by a message processing computer 6, which in turn encodes the information in a manner compatible with radio transmitter 7, and which in turn broadcasts the information through antenna 30 to a receiving antenna in digital pocket pager 29. Pocket pager 29 is illustrated as displaying the message "2-3XXX". This indicates to the owner of pager 29 that detector 3 at facility 2 has annunciated an event which deserves immediate attention. The "XXX" represents an alphanumeric message describing the nature and/or magnitude of the emergency event. The owner of pager 29 can now make an appropriate decision as to what kind of response to make. Of course, this is merely one way of displaying the information detected originally by detector 2-3, and is given for illustrative purposes. More complex readouts can certainly be implemented within the scope of this invention. Indeed, the complexity and specificity of the message displayed in pager 29 is limited only by the ingenuity of the designer and the capacity of existing technology. Those skilled in the art will readily recognize that the system as presently constituted can provide information to pager 29 to characterize the emergency event in whatever detail is desired.

Figure 2:
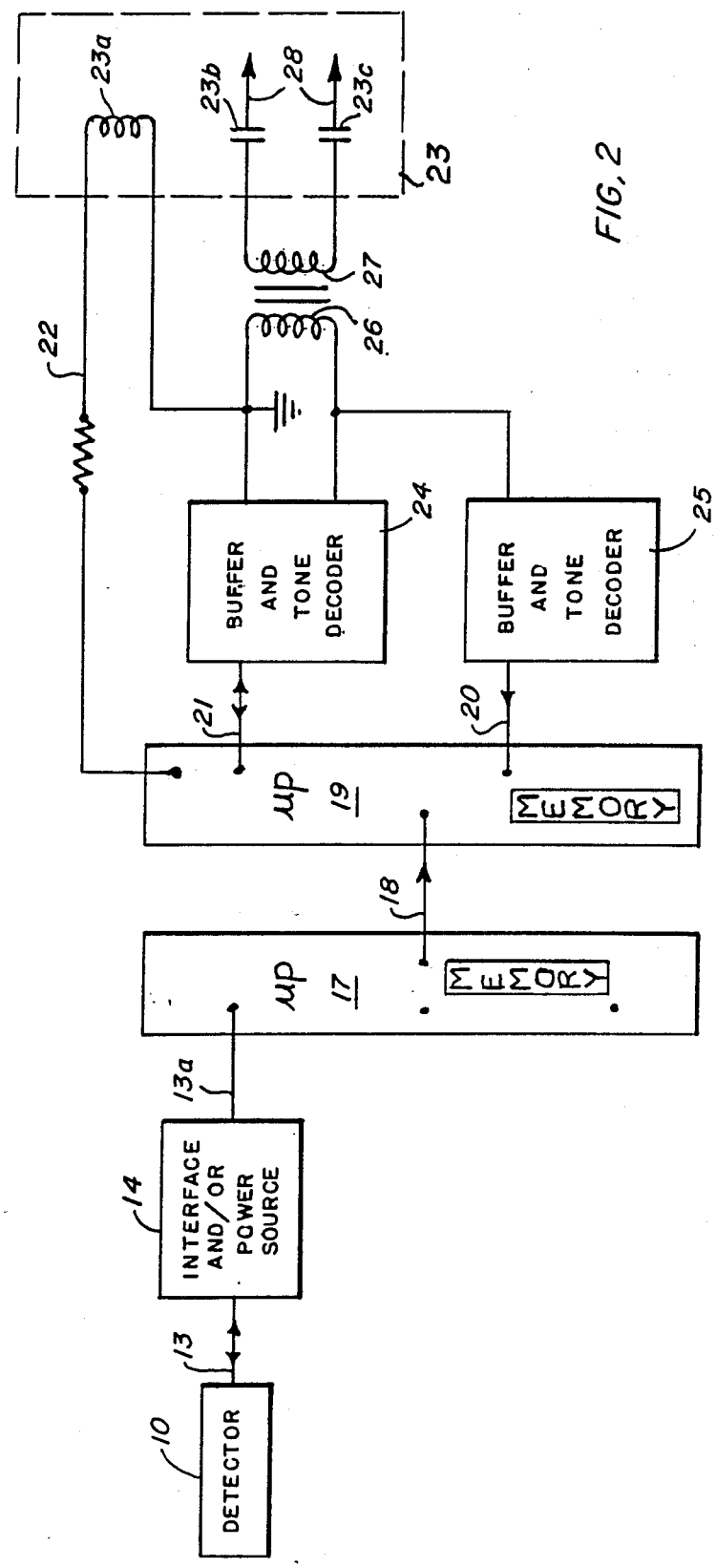
FIG. 2 is a combination block diagram and circuit diagram of the portion of the system that interfaces with event detectors to detect emergency events.

With particular reference to FIG. 2, the details of a specific facility monitor are shown. The facility monitor 2 contains a computer in the form of two commercially available microprocessors 17, 19, which can be, for example, Motorola Chip No. SY44721C or HEO8877. These microprocessors are pre-programmable in a manner well understood by workers in this field, and for this particular application are to be programmed in the manner discussed below. For illustrative purposes, only one event detector (field detector) 2-3 is shown, which corresponds to activated detector, 2-3 of FIG. 1. Detector 2-3 is electronically tied to microprocessor 17 through line 13, 13a and interface 14, the latter being more fully described below in the discussion of FIG. 3. Upon detecting a fault indicating an emergency event, detector 2-3 sends a signal identifying such to microprocessor 17. Microprocessor 17 is pre-programmed to sequentially, in a closed loop, inspect each input line from each of its detectors to determine whether any has a signal present identifying an emergency event. Upon detection by microprocessor 17 of the emergency event annunciated by detector 2-3, microprocessor 17 is pre-programmed to extract from its memory a pre-coded digital signal (byte) corresponding to the particular detector (2-3) which has activated, the digital signal containing information identifying the location of the detector, and the kind of event the detector annunciates, and sends this signal along bus 18. For plural simultaneous events, microprocessor 17 is pre-programmed to send these signals in the sequence that processor 17 identifies them across bus 18 into the memory of microprocessor 19, which queues these signals in a linear memory stack. Upon the receipt in memory of microprocessor 19 of any such signal from microprocessor 17, microprocessor 19 is pre-programmed to send a control signal along line 22 to energize the control coil 23a of relay 23. Energization of coil 23a causes relay contacts 23b and 23c to close, connecting pickup coil 27 to telephone line 28, thereby passing a dial tone signal from the phone company through pickup coil 27. The dial tone signal through coil 27 is picked up on coil 26 and sent to microprocessor 25, a pre-programmable microprocessor which can be, for example, Chip No. J-112C320-AR by Motorola.

Upon the dial tone being detected by microprocessor 25, processor 25 sends a signal to microprocessor 19 indicating the presence of a dial tone. Microprocessor 19 is programmed to wait, preferably about 30 seconds, and then check again to determine whether the dial tone is still present. This prevents the triggering of the system upon spurious signals through coil 26, which otherwise would cause the data from microprocessors 17 and 19 to be sent across a dead phone line, thereby losing the information and letting emergency events go unreported. Upon microprocessor 19 determining that a dial tone persists, microprocessor 19 is programmed to transmit the first data byte in its queued stack to microprocessor 24. Microprocessor 19 is pre-programmed to send the first data byte in its queue to the memory of microprocessor 24, which is a tone coder, i.e. a pre-programmed microprocessor capable of converting the digital byte into dual tone multi-frequency signals of the type normally used for dialing. An example of such a device is Chip No. MA-U1311S20 E10 by R.C.A. Microprocessor 24 does this and transmits the tone coded information to coil 26, thence to telephone pickup coil 27, telephone line 28, and ultimately to the telephone company central office 4. As is apparent from the foregoing, pre-programmed microprocessors perform a great deal of the work in this circuit. Those skilled in the art will recognize that such microprocessors are readily available (examples of which are given above) and that such microprocessors can be readily programmed in the manner set forth herein. Additionally, the foregoing discusses the transmission of digital signals. It is recognized that some commercial hardware can vary on this theme by coding and processing signals in, e.g. octal, hexadecimal, etc. Those skilled in the art will choose, within the scope of the invention, the coding format most suited to any particular application of the invention.

Figure 3:
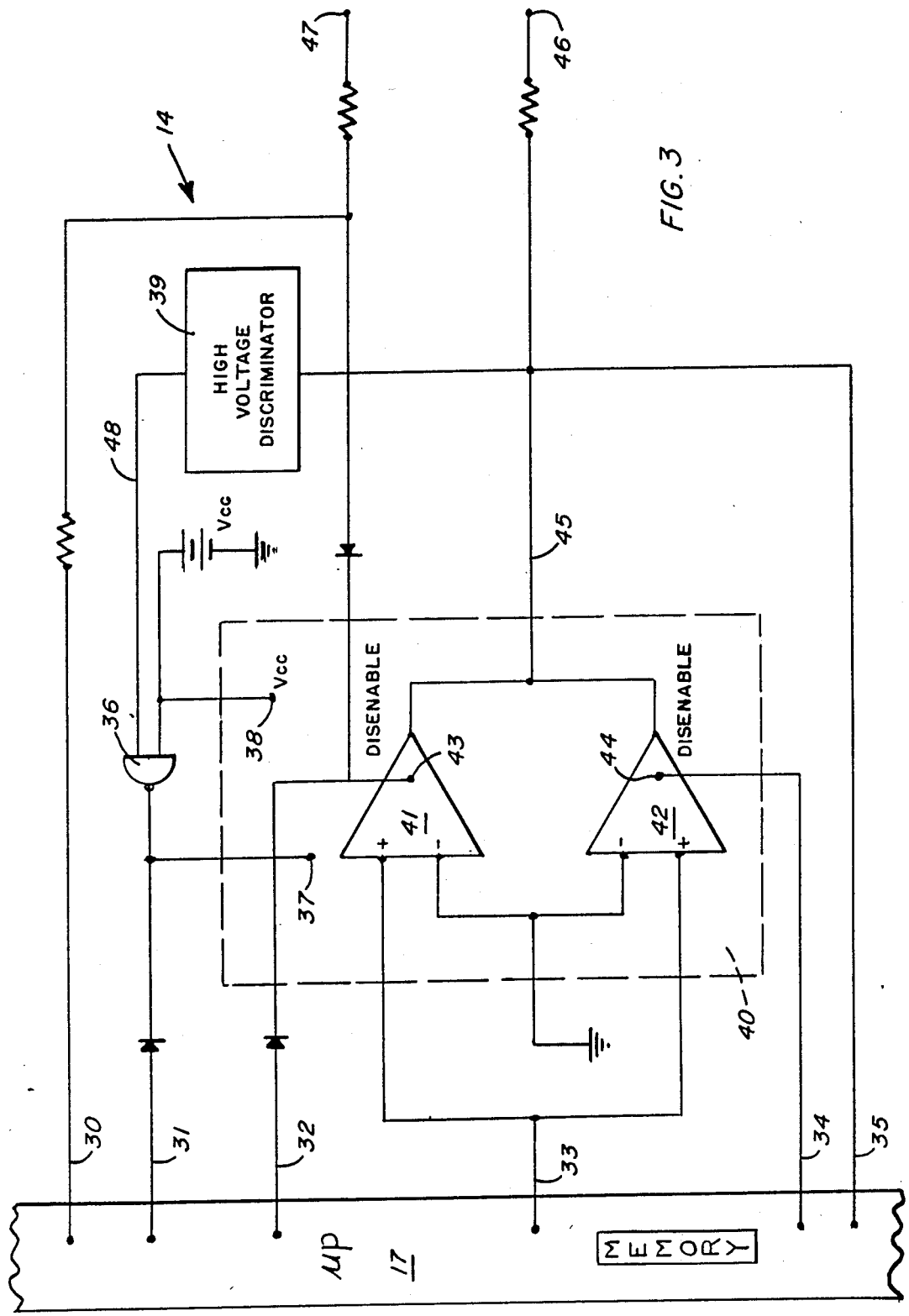
FIG. 3 is a circuit diagram of a preferred interface between the system and event detectors.

With particular reference to FIG. 3, one can see a preferred circuit 14 for interfacing between field detectors, of the system and microprocessor 17. One such circuit is required for each system detector, the detector being connected across circuit 14 at connectors 46, 47. Circuit 14 can accomodate detectors that require externally supplied DC power to operate (such as resistive detectors and switches), as well as those that supply their own power and detection signals, (e.g. thermocouples). Microprocessor 17 is field programmed to know which kind of detector is connected across 46, 47, to know what kind of power signal (if any) the detector requires, and to know what signal corresponds to the detector's quiescent state. In the case of detectors that generate their own detection signals undriven by circuit 14, microprocessor 14 monitors the detector merely by detecting the signal across 46, 47 via lines 30, 35. For detectors that must be driven by circuit 14, power, typically in the form of pulsed DC, is supplied by operational amplifiers 41, 42 through line 45 to point 46, the latter being normally positive with respect to 47. In the embodiment shown in FIG. 3, two operational amplifiers are shown. Although one appropriately selected operational amplifier could in some applications substitute for the pair of operational amplifiers 41, 42, some commercially available detectors work best with a low current, relatively precise voltage, power signal, whereas other detectors are more tolerant of slight variations in voltage, but require appreciable current, and the pair of amplifiers 41, 42 accomodate this. Operational amplifier 41 is operated to provide precise gain, but very little current, whereas operational amplifier 42 is operated to provide greater current. The wiring of operational amplifiers, and the selection of particular operational amplifiers, to provide such operation is well understood in electronics and by those skilled in this art; accordingly, this is not shown here in detail. In the embodiment of FIG. 3, the operational amplifiers 41, 42 are shown as part of a monolithic chip 40, which could be, for example, (Part No. UF-17-C4A). As an example of the kind of circuit that operates best on constant, precisely regulated, voltage and small current is a variable resistance detector, whose particular value is detected by means of a voltage division across plural resistors. As an example of the kind of detector that requires significant power and less voltage regulation is a photodetector (which conducts to complete a circuit only in the presence of light), or any other kind of normally open or normally closed switch.

To drive such a passive detector, microprocessor 17 sends pulsed DC signals along line 33 to the non-inverting input ports of operational amplifiers 41, 42. Microprocessor 17 is pre-programmed in the field to decide which of operational amplifier 41, 42 shall be operative, and which not. Control signals for this purpose are sent along lines 32 and 34. Lines 32 and 34 are connected at 43 and 44 to pins in monolithic chip 40 which, when activated, disenable amplifiers 41, 42, respectively. Although a great many commercially available operational amplifier chips have such disenabling capacity built into the chips themselves, the same effect can be readily obtained with discrete operational amplifier components and the use of simple gating logic to, for example, disconnect power (Vcc) to the operational amplifier upon appropriate control signal from microprocessor 17, as understood by those skilled in the art. The amplified pulses from line 33 are transmitted along line 45 to the field detector connected electrically across points 46, 47, and returned via line 30 to microprocessor 17 for system detection. If, for some reason, one wishes to place a detector across 46, 47 that must be driven with a signal of reversed polarity (i.e. 47 positive with respect to 46), microprocessor 17 is pre-programmable to disenable amplifiers 41, 42, and send power to the detector via line 30.

Additionally, a user of the system may accidentally plug in a detector wholly incompatible with the system because it generates an electrical potential sufficiently large enough to damage system components. To accommodate this, the potential at 46 is monitored through line 48 and fed into NAND gate 36 along with power for the operational amplifier (Vcc). In line 48 is high voltage discriminator 39, which is activated upon the presence at 45 of an excessively high voltage of predetermined magnitude. The discrimination can have a circuit, such as that used for full wave rectification, to ensure that the voltage transmitted to 36 is always higher than ground, regardless of the voltage's polarity at 45. Upon discriminator 39 being activated, NAND gate 36 changes state from active to inactive, which state is transmitted to pin 37 of monolithic chip 40 isolating chip 40 entirely, and disabling it. Alternatively, if one is using operational amplifier chips that have no such disenable option, one could simply use the output of NAND gate 36 to break line 38, the power source Vcc for both amplifiers 41, 42.

Preferably, microprocessor 17 is pre-programmed to record in memory each of its detectors' quiescent state, and annunciate an emergency event upon detection of any detector signal that deviates from the detector's baseline. Microprocessor 17 is pre-programmed to do this by classifying the potential across the variable resistor (i.e. across points 46, 47) according to a plurality of pre-programmed potential windows, in a manner well known to those skilled in the art.

In the memory of microprocessor 17, one pre-programmable data byte is associated with each potential window. Upon reception of a detector signal of a magnitude to place it within a devient (non-quiescent baseline) potential window, the data byte associated with that window is transmitted by microprocessor 17 on unit 2 to pager 29 via location 4, 5, 6, 7, 30, as discussed above. In this manner, pager 29 receives a signal containing the location, nature and magnitude of the detected emergency event.

If, however, microprocessor 17 is not field programmed with such quiescent baselines, microprocessor 17 is pre-programmed, upon initial connection of power to the entire system, to note, or to send signals sequentially to determine, the initial, presumably quiescent, state of each detector, and record these states in memory to act as de facto baselines for future comparison. So that the invention can be used with a wide variety of field detectors, microprocessor 17 does this without knowing beforehand what kind of detectors are attached to its facility monitor. To do this, microprocessor 17 is pre-programmed to perform the following routine on each facility monitor's detector upon initial energization of the system: Microprocessor 17 sends a signal through line 35, or alternatively through line 33 and 45, to detector input port 46, and records in memory the magnitude of the signal received back. Microprocessor 17 then repeats this procedure by sending a signal of reverse polarity along line 30. If the magnitude of the signal remains unchanged regardless of polarity, microprocessor 17 records in its memory that the detector connected across 46, 47 is resistive in nature. If the magnitude of these test signals not only remains unchanged, but is effectively unattenuated (i.e., falls within the uppermost potential window pre-programmed into microprocessor 17), microprocessor 17 identifies the detector as being a normally closed switch. If microprocessor 17 receives back a signal of one polarity, but not the other, microprocessor 17 then characterizes the detector as uni-polar, and pre-programs itself to send signals of the required polarity, either along line 30, or along line 33, as hereinabove described. If microprocessor 17 receives no signal back regardless of signal polarity, microprocessor 17 characterizes the detector as a normally open switch. In this manner, microprocessor 17 not only characterizes the nature of all detectors associated with its facility monitor, but also measures the quiescent (non-emergency) base line of the detectors, against which all future signals from the detectors are compared.

The instant invention has been shown and described herein in what is considered to be the most practical preferred embodiment. This description, however, is done for purposes of illustration rather than limitation.

Accordingly, the scope of the instant invention is to be discerned solely by reference to the accompanying claims, wherein I claim:

1. A detector and communication system comprising:
   one or more detecting means for detecting one or more emergency events;
   at least one facility monitor means for annunciating said emergency events responsive to detection of any of said one or more emergency events by any of said one or more detecting means wherein said facility monitor means comprises a programmable computer;
   a receiver means for receiving an event message from at least one of said facility monitor means responsive to said detection of any of said one or more emergency events by any of said one or more detecting means;
   an electrical port connected to at least one of said detecting means and said programmable computer, said port comprising at least one pair of electrical leads, each pair including one input and one output lead, said port capable of sustaining a voltage between said pair of electrical leads;

power means connected to said port for supplying a voltage to said leads;

wherein said facility monitor is effective to transmit said event message to said receiver means responsive to said detection of any of said one or more emergency events by any of one or more detecting means, and wherein said facility monitor is effective to encode said event message with information sufficient to identify at least which of said one or more facility monitor means is transmitting and which of said one or more detecting means has caused said detection;

wherein said programmable computer is effective to selectively cause said power means to apply a voltage positive with respect to circuit ground on one of said pair of leads, or apply a voltage positive with respect to circuit ground on the other of said pair of electric leads;

wherein said programmable computer is effective to measure the voltage across said pair of leads;

said programmable computer comprises means for transmitting said event message to said receiver means, said computer comprising a memory;

said programmable computer being effective to:

receive in memory one or more precoded annunciation messages;

receive in memory a datum point corresponding to a reference voltage;

compare said reference voltage to said voltage across said pair of leads;

cause said means for transmitting said event message to transmit to said receiver a preselected one of said precoded annunciated messages responsive to said voltage across a said pair of leads deviating from said reference voltage by a preselected amount, whereby said preselected one of said precoded annunciation messages becomes said event message;

wherein said programmable computer is effective to determine that said memory contains no reference voltage, and responsive to determining that said programmable memory contains no reference voltage, and in sequence:

measure the voltage drop across said pair of leads, and if said voltage drop across said pair of leads is non-zero, record said voltage drop across said pair of leads in said memory as a new said reference voltage, and cause said power means to be disenabled from applying any potential positive with respect to ground to either of said pair of leads;

if said voltage drop across said leads is zero, cause said power means to apply a voltage positive with respect to ground to said one of said pair of leads;

measure the magnitude of voltage drop across said pair of leads;

if said voltage drop is non-zero, record said voltage drop in said memory as a new said reference voltage and disenable said power means from applying a voltage positive with respect to ground on said other said pair of leads;

if said voltage drop is zero, cause said power means to apply a voltage positive with respect to ground to said other of said pair of leads;

measure the magnitude of said voltage drop across said pair of leads;

if said voltage drop is non-zero, record said voltage drop in said memory as a new said reference voltage and disenable said power means from applying a voltage positive with respect to ground on said one of said pair of leads;

if said voltage drop is zero, record zero as a new said reference voltage and disenable said power means from applying a voltage positive with respect to ground on said other of said pair of leads.

2. The system of claim 1, wherein said receiver means is a digital pocket pager effective to display visually said message.

3. The system of claim 1, wherein said facility monitor means comprises a circuit means for accessing a telephone line automatically, said circuit means comprising;

a telephone pick-up coil, said pick-up coil isolated from said telephone line by one or more relay contacts;

a sending coil magnetically coupled to said pick-up coil by a magnetic coupling, said sending coil being effective by said coupling to send tone coded data to said telephone line via said pick-up coil;

said sending coil being further effective by said coupling to receive a dial tone signal from said telephone line via said pick-up coil;

a tone decoder means for identifying the presence of a dial tone responsive to a dial tone being received by said sending coil from said pick-up coil;

a tone coder means connected to said sending coil for converting data into coded tone signals;

a control means having a memory for controlling said tone coder means, said control means effective to:

receive in said memory said event message;

operatively connect said pick-up coil to said telephone line by closing said relay contacts responsive to the presence in said memory of said event message; and cause said message to be transmitted to said tone coder means;

wherein said tone coder means is effective to cause:

said event message to be translated into tone code responsive to said event message being transmitted to said tone coder means from said control means; and cause the transmission of said event message in tone code to said sending coil effective to send said event message in tone code to said telephone line via said pick-up coil and relay contacts.

4. The system of claim 1, wherein said power means comprises:

one or more operational amplifiers, the output of each of said one or more operational amplifiers being effective to apply a voltage positive with respect to ground on said one of said pair of leads responsive to the inputs of each of said one or more operational amplifiers being driven by said computer;

an electrical lead extending between said computer and said other of said pair of leads, said electrical lead being effective to apply a voltage positive with respect to ground on said other of said pair of leads responsive to said computer selectively causing a voltage positive with respect to ground to be applied to said electrical lead.

5. A circuit means for interfacing with a communications line, said circuit means comprising:

a programmable computer connected to said communications line;

an electrical port comprising at least one pair of electrical leads and connected to said programmable computer, said port capable of sustaining a voltage between said leads, and a power means connected to said port for supplying a voltage to said pair of electrical leads;

wherein said computer is effective to measure the voltage across said pair of leads;

said computer comprises means for transmitting an event message over said communications line, said computer comprising a memory;

said computer is effective to selectively cause said power means to apply a voltage positive with respect to circuit ground on one of said pair of leads, or apply a voltage positive with respect to circuit ground on the other of said pair of electrical leads;

said computer is effective to selectively reverse voltage polarity between said one and said other of said pair of leads;

wherein said computer is effective to:

receive in said memory one or more precoded annunciation messages;

receive in said memory a datum point corresponding to a reference voltage;

compare said reference voltage to said voltage across said pair of leads;

cause said means for transmitting said event message to transmit over said communications line a preselected one of said precoded annunciation messages responsive to said voltage across said pair of leads deviating from said reference voltage by a preselected amount, whereby said preselected one of said precoded annunciation messages becomes said event message;

wherein said programmable computer is effective to determine that said memory contains no reference voltage, and responsive to determining that said programmable memory contains no reference voltage, and in sequence:

measure the voltage drop across the pair of leads, and if said voltage across said pair of leads is non-zero, record said voltage drop across said pair of leads in said memory as a new said reference voltage, and cause said power means to be disenabled from applying any potential positive with respect to ground to either of said pair of leads;

if said voltage drop across said leads is zero, cause said power means to apply a voltage positive with respect to ground to said one of said pair of leads;

measure the magnitude of voltage drop across said pair of leads;

if said voltage drop is non-zero, record said voltage drop in said memory as a new said reference voltage and disenable said power means from applying a voltage positive with respect to ground on said other said pair of leads;

if said voltage drop is zero, cause said power means to apply a voltage positive with respect to ground to said other of said pair of leads;

measure the magnitude of said voltage drop across said pair of leads;

if said voltage drop is non-zero, record said voltage drop in said memory as a new said reference voltage and disenable said power means from applying a voltage positive with respect to ground on said one of said pair of leads;

if said voltage drop is zero, record zero as a new said reference voltage and disenable said power means from applying a voltage positive with respect to ground on said other of said pair of leads.

6. The circuit means of claim 5, wherein said power means comprises:

one or more operational amplifiers, the output of each of said one or more operational amplifiers being effective to apply a voltage positive with respect to ground on said one of said pair of leads responsive to the inputs of each of said one or more operational amplifiers being driven by said computer;

an electrical lead extending between said computer and said other of said pair of leads, said electrical lead being effective to apply a voltage positive with respect to ground on said other of said pair of leads responsive to said computer selectively causing a voltage positive with respect to ground to be applied to said electrical lead.

* * * * *